Feb. 5, 1946. C. S. PFEILSTICKER 2,394,260
METHOD OF AND MACHINE FOR MOLDING
Filed Oct. 18, 1939 3 Sheets-Sheet 1
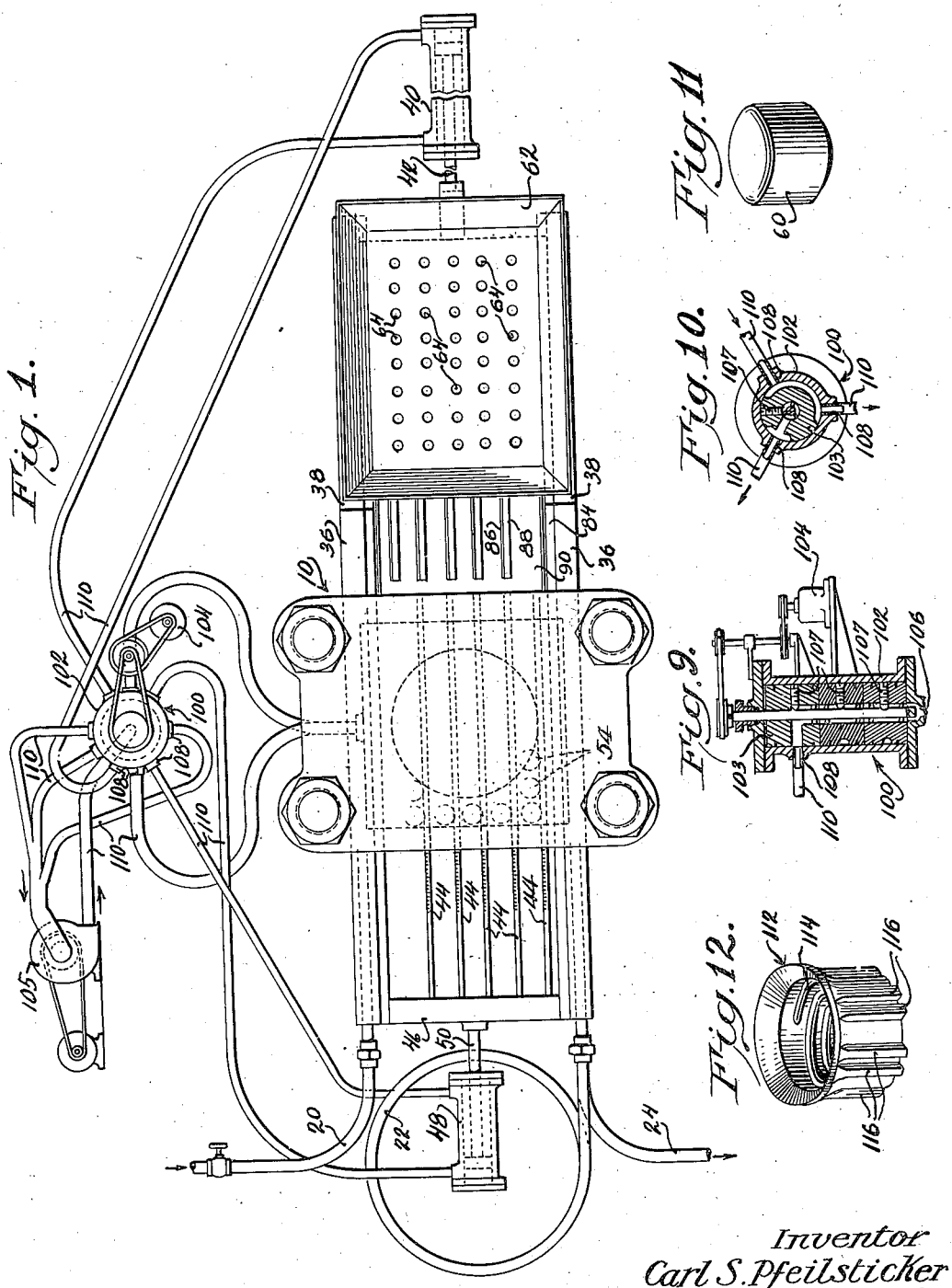
Inventor
Carl S. Pfeilsticker
By Wm R. Smith
Attorney Feb. 5, 1946.   C. S. PFEILSTICKER   2,394,260
METHOD OF AND MACHINE FOR MOLDING
Filed Oct. 18, 1939   3 Sheets-Sheet 2
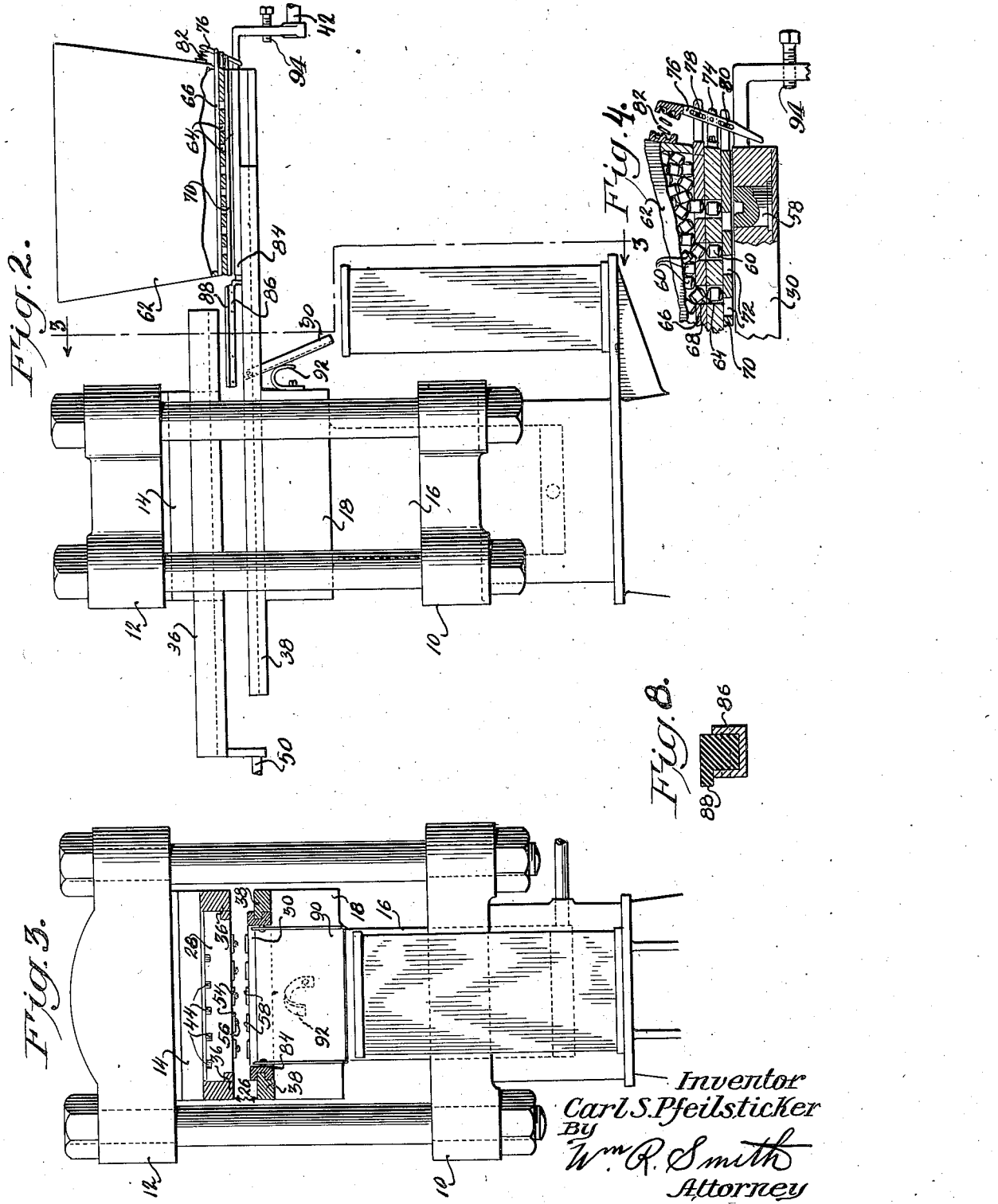
Inventor
Carl S. Pfeilsticker
By Wm R. Smith
Attorney Feb. 5, 1946. C. S. PFEILSTICKER 2,394,260
METHOD OF AND MACHINE FOR MOLDING
Filed Oct. 18, 1939 3 Sheets-Sheet 3
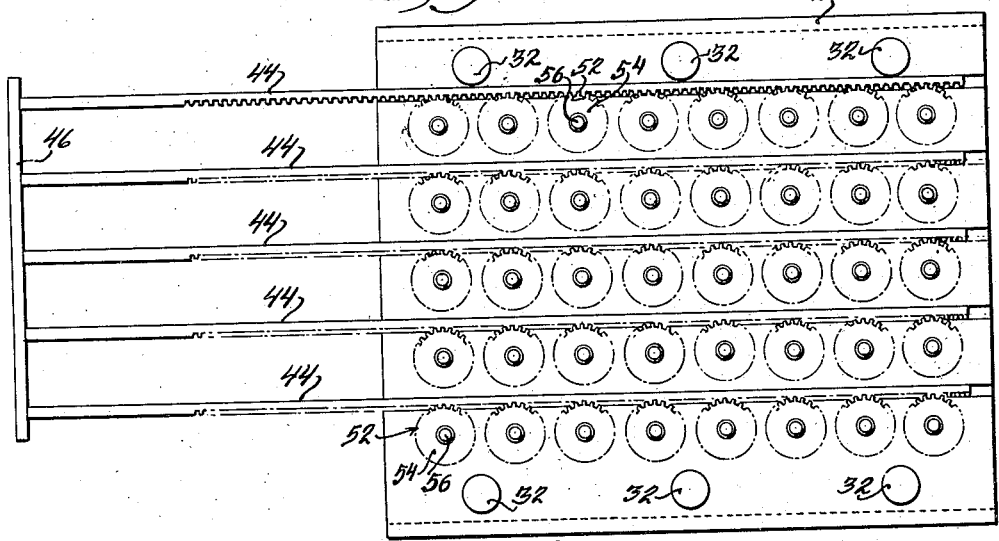
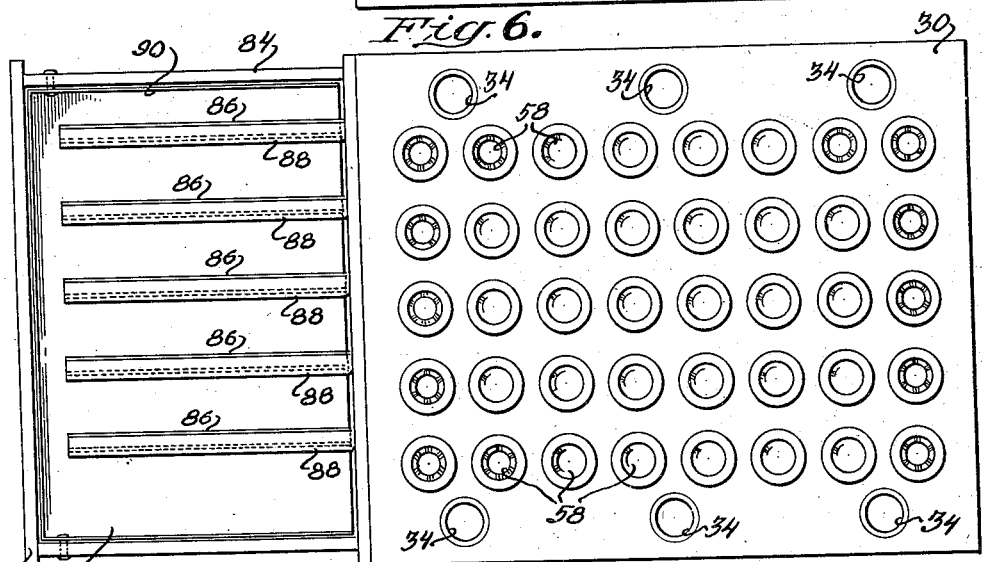
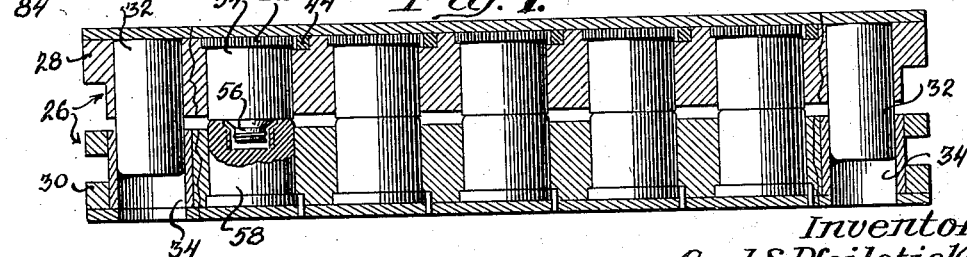
Inventor
Carl S. Pfeilsticker
By Wm R. Smith
Attorney Patented Feb. 5, 1946

2,394,260

UNITED STATES PATENT OFFICE 2,394,260

METHOD OF AND MACHINE FOR MOLDING

Carl S. Pfeilsticker, Jenkintown, Pa., assignor to F. J. Stokes Machine Company, a corporation of Pennsylvania Application October 18, 1939, Serial No. 299,937

27 Claims. (Cl. 18—16)

This invention relates to the molding of plastics under pressure and subjected to heat and, more particularly, to the manufacture of articles embodying screw threads.

A purpose of this invention is to provide a fully automatic, continuously operated machine in which it is only necessary to furnish molding compound in powder, pellet, blank, or any other suitable form, to be molded, the machine being capable of performing each successive stage of the operation and delivering the finished article therefrom automatically.

A further purpose of the invention is to provide a gang mold wherein each of the separate operations are performed simultaneously in multiple.

A further purpose of the invention is to provide method and means for releasing the molding pressure at substantially the same time on all faces of the articles being molded.

A further purpose is to provide a molding machine having molding means capable of rotary and retractable motions, both of said motions cooperating in the ejection of the finished product.

A further purpose is to provide a machine for forming screw threads integral with a part of a molded article and to utilize the molded threads in cooperation with a rotary mold to assist in the ejection of the molded article from the mold.

A further purpose is to provide a machine for forming ribs upon a part of a molded article and to utilize the molded ribs in guiding the article from the mold and in assisting its ejection from the machine.

With these and other purposes in view, which will become apparent from the following detailed description of the illustrative embodiments of the invention shown in the accompanying drawings, my invention resides in the novel arrangement of mechanism and articles and the method of forming the same, as hereinafter more particularly pointed out in the claims.

In these drawings:

Figure 1 is a plan view of a suitable mechanism for the production of the molded articles claimed, and embodying the necessary elements to practice my method;

Figure 2 is a side elevation of the machine illustrated in Figure 1;

Figure 3 is a sectional elevation taken on line 3—3 of Figure 2;

Figure 4 is an enlarged sectional view of a portion of the mold loading device;

Figure 5 is a bottom view of the male portion of the mold;

Figure 6 is a top plan view of the female portion of the mold;

Figure 7 is an enlarged cross section of the male and female molds in operative relationship;

Figure 8 is an enlarged sectional view of a disengaging finger;

Figure 9 is a longitudinal section through the control valve mechanism;

Figure 10 is a transversal section through said control valve mechanism;

Figure 11 is an enlarged perspective of pellet blank to be molded by the machine;

Figure 12 is an enlarged perspective of one of the articles formed by the machine.

In the past, it has been the practice to mold articles similar to that herein illustrated by a succession of manual operations which consumed much time, required considerable space, and added materially to the cost of the finished product.

In accordance with such past practice, it was customary to introduce the molding compound to female gang molds, and then place male gang molds over the female gang molds within a heated platen press. When the operator thought the time duration sufficient to have formed the article, the press was opened, and the male gang molds were removed manually to a table. A device similar to a portable drill having a mandrel adapted to co-fit with the exposed face of the finished molded article was then applied to each of the articles in succession in order to loosen them from the molds. As some of these gang molds had as many as a hundred or more individual forms, it may readily be appreciated that this operation alone was comparatively long and tedious.

This, however, did not complete the operation. After the articles were loosened by this procedure, it was the custom to complete their removal by imparting a continued rotary movement thereto by hand, the hands of the operator being protected from the retained heat of the mold by heavy leather gloves, the fingers of which were subjected to a great deal of wear, and their necessary frequent replacement created an additional cost chargeable to the product. The mold then had to be replenished by hand with the molding compound for a succeeding operation.

In my present invention, I eliminate many of the motions, and every operation now employed is fully automatic and automatically timed. By the cooperation and timing of some of said mechanisms, an improved method in molding is produced, resulting in a much improved article and the elimination of imperfect products.

Referring now to the drawings, wherein like characters refer to like parts throughout, 10 indicates a conventional press comprising a base 12, a head 14, and a vertically movable ram 16. The ram 16 is provided with a head 18 similar to the head 14, both being hollow for the reception and retention of heat. In the present instance, steam is introduced from a source of supply, not shown, through a pipe 20, first to the head 14, thence through an intermediate pipe 22 connecting the head 14 with the head 18, and thence back to the source of supply through a pipe 24. The pipes 22 and 24 are sufficiently flexible to permit the movement of the ram 16.

To the under-face of the stationary head 14, I attach one element of a separable gang mold 26. This mold comprises two parts—an upper part 28 supporting the male elements, and a lower part 30 which carries the female elements. The two parts are initially aligned prior to closing with the assistance of guide pins 32 fixed in part 28 and adapted to co-fit with openings 34 formed in the lower part 30. The lower portion 30 is carried on top of the ram 16 and is adapted to be raised into contact with the upper part by the ram when the latter is raised.

The upper part of the mold 28 is attached to the stationary head 14 by means of guide bars 36—36 and, after being centered, has no further movement while the lower portion is attached to the ram head by means of guide bars 38—38, and moves vertically therewith and, at the same time, affords trackways for the reciprocation of the lower mold.

The reciprocatory movement of the lower mold is controlled by a hydraulic cylinder 40 and piston and rod 42, the motive power being derived from a source of well known design and, therefore, not shown. The vertical movement of the ram 16 is likewise powered from the same source. It will be understood that other motive forces, for example, air, could be used to accomplish the same movements with but slight change in the control equipment.

While the upper portion 28 of mold 26 is fixed, it forms a housing for a plurality of reciprocating racks 44, they in turn being attached to a common cross head 46 located at the rear of the press 12 and guided by the guide bars 36—36. The reciprocating movement of these racks and their crosshead is provided by the action of a hydraulic cylinder 48 and a piston and rod 50 working therewith, the motive force being provided from the same source and controlled in the same manner as the cylinder 40 and its piston and rod 42.

The reciprocating movement of the racks is slight as compared with that of the lower mold 30 (in the present machine being about three inches, as against about twenty inches for the mold).

Each of these racks mesh with gear wheels 52 formed upon the upper outer periphery of a series of rotatable molding forms 54, each of which carries a male element 56 in the form of a thread forming die. The lower mold 30 carries a series of female elements 58 adapted to register with each of the forms 54, and the molding compound preferably in the form of pellets indicated at 60, is automatically placed, one in each form, prior to positioning for the molding operation. This is accomplished by the movement of the mold 30 coacting with the following mechanism.

Positioned directly above the space occupied by the mold 30 when it has reached its limit of travel away from the press is a hopper 62, designed to hold a supply of blanks or pellets 60. The bottom of this hopper is provided with a series of openings 64, one for each element 58, and adapted to register therewith when mold 30 is in its outermost position. Located on top of the hopper bottom and adapted to slide thereon is a relatively thin plate 66 likewise carrying a series of openings 68 of like number, and registerable with the openings 64, while immediately under the hopper's bottom is another sliding plate 70 also provided with openings 72 of like number and registerable with openings 64.

Projecting from the hopper is a bearing 74 and pivoted at its outer end a cross arm 76. The cross arm is attached to the bearing near its center and each of its outer free ends are slotted to receive pins 78 and 80 fixed in extensions of the plates 66 and 70 respectively. A pressure spring 82 tends to position the top plate 66 so that its openings 68 are in register with the openings 64 in the bottom of the hopper and, at the same time, position the plate 70 so that its openings 72 are out of register with the openings 64. The lower end of the arm 76 is extended to lie in the path of the mold 30 and to be moved thereby when it reaches the end of its reciprocatory motion. With the movement of this arm, the plates 66 and 70 are shifted so that the openings 68 move out of register with the openings 64 and the openings 72 move into register therewith, permitting pellets 60 previously positioned in openings 64 to drop by gravity into the female elements 58 in register below. Where the mold 30 begins its return movement towards the press, the cross arm 76, influenced by spring 82, changes its position and therewith the position of the two perforated plates 66 and 70, permitting pellets 60 to refill spaces 64 in the hopper's bottom and to retain them in this position ready for delivery until the mold 30 again returns to the tripping position just described for refilling.

The mold 30 is further provided with an automatic means for discharging the finished product as, and after, it leaves the press 10. This mechanism comprises an extension frame 84 mounted on, and extending parallel from, one end of the mold proper, and when the mold is positioned for the molding operation, it lies outside and beyond the press structure. A plurality of extension fingers 86 are carried by the frame 84, one for each longitudinal row of forming elements 58. These fingers are preferably of channel formation and each one houses a contact strip 88 of a yielding material, for example, rubber. One edge of these strips 88 is so positioned as to contact the outer face of each of the finished molded articles. The fingers 86 with the attached strips 88 constitute wiper bars or contact elements for unscrewing the molded articles from the thread forming elements 56 by movement of frame 84. Pivoted within the frame 84 and carried thereby is a dump tray 90 which is held up parallel with the frame 84 by the top of the ram head 18 during the time the mold 30 is in the molding position within the press, but is designed to be lowered gradually by gravity over a cam finger 92 as the mold 30 withdraws laterally from the press. This tray is pivoted at one end within the frame 84 and the weight of its free end causes it to tilt and discharge its contents. Upon the return stroke of the mold 30, the tray is returned to its initial receiving position under the influence of the cam finger 92. As it is highly essential that the male element 56 register precisely with the female element 58, when the two sections 28 and 30 of gang mold 26 are brought together in the press for the actual molding operation, I provide adjustable stops 94 on one end of the mold 30 which may be accurately adjusted to limit the inward travel of the mold by abutting against a face of the head 18.

The complete cycle of operation is controlled from a timing source capable of continuous operation and adjustable to synchronize and time the several movements. Such a device is illustrated and designated generally at 100. In the present showing, it comprises a housing 102 for a rotating fluid valve 103, the motive power for which is furnished by a motor 104 suitably geared to the shaft of the valve. Fluid pressure from a pump 105 is introduced to an intake 106 through the valve proper, which comprises separate rotating sections for the control of each movement of the machine, and each section is designed to bypass liquid pressure to its respective operating cylinder for the time duration necessary to cause the respective pistons to complete their strokes, to retain them in position, and to reverse said pistons for required return movements.

The fluid pressure is confined in a closed system and is forced continuously from the pump 105 to timing device 100, thence through the various passages of the valve 103 and back to the pump.

Each separate section 103 of valve 100 is rotatably mounted on the driving shaft and their relative timing positions are adjustable by means of set screws 107. The housing 102 is provided with ports 108 communicating with pipes 110 which, in turn, convey the fluid pressure through the necessary courses to operate the several movements of the machine.

An example of a finished product of the present machine is shown in an enlarged perspective in Figure 12, wherein the article itself is designated at 112, the internal screw thread at 114 and the external ribs at 116. It is not absolutely essential that the outer contour be composed of ribs, as the fingers 86 will function the same if the outer face be oval, or even circular.

In operation, the hopper 62 is filled with pellets or blanks 60, as are the spaces 64. We will assume the mold 30 is in a position just about to reach the outward end of its stroke away from the press, being moved by the piston and piston rod 42 operating in cylinder 40 under the control of the valve 100. As the mold approaches the limit of its outward movement, it engages the end of arm 76 and moves it against the action of pressure spring 82, causing the upper plate 66 to shift and close the tops of openings 64 in the bottom of the hopper and, at the same time, shift the plate 70 to permit the pellets 60 occupying openings 64 to drop through openings 72 in the latter plate and into the female elements 58 which, at this time, have come into register beneath the latter openings. As soon as the elements 58 are filled, the valve 100 is timed to reverse the action of piston 42, causing mold 30 to begin its travel toward the press. This travel is continued until halted by stops 94 contacting with a side wall of the press and coincidental therewith the piston 42 is stopped by the timing of valve 100 which now moves through a period of dwell while the mold 30 is being moved to close.

The valve 100 now opens the port, which permits the fluid pressure to pass to the ram 16, causing the head 18 to rise and bring the mold 30 into contact with the fixed mold 28 located in the stationary head 14, where the plastic pellets 60 are outwardly formed to the shape of the female element 58 and internally by the male element 56 which, in the present designs, forms a screw thread. Heat of sufficient temperature is continuously supplied to the press through a pipe 20 connecting with the upper fixed head and circulating through the pipe 22 to the lower movable head and outward therefrom through the pipe 24 for re-circulation.

During the time of this molding operation, the control timing device is idling, holding all moving parts inactive, and the duration of this period can be varied by changing that section 103 of the timing device which coacts to move the ram 16. As soon as the forming is complete, the control 100 causes both the ram piston and the piston 50 controlling racks 44 to start moving simultaneously, resulting in a vertical movement of the now formed pellets away from the male portion of the mold 56, due to the turning of this element by the racks 44 through their connection with the gear wheels 52 on the rotatable molding forms 54, thereby releasing any trapped air pressure from the top of the molded pellets and, at the same time, the mold 30, moving with the ram 16 and head 18, withdraws from the molded pellets and releases pressure from the sides and bottom thereof, and any air pressure which may have been trapped in the bottom mold. This simultaneous release is highly important, as a continued pressure in any one direction (which is sometimes caused by trapped air behind the pellets) after pressure has been released in another direction, will result in the semi-soft molded plastic being forced out of shape and the desired contours imperfect.

The mold 30 leaves the finished product prior to the time the rotating male mold 56 has moved them off therefrom, leaving the molded pellets suspended loosely, one on each of the male molds. Immediately after the mold 30 has reached the limit of its downward movement, under the control of the timing device, and the latter causes the racks 44 to cease their movement through the action of their controlling piston 50 and starts the piston 42 operating to move the mold 30 outward from under the stationary head 14 of the press 10. As the mold 30 and, therewith, the extension frame 84 continues this movement, the fingers 86, through their strips 88, contact the suspended molded pellets now hanging loosely on the male elements 56, causing them to rotate and spiral off said elements and finally drop into dump tray 90. The continued movement of mold 30 and frame 84 carries the tray 90 beyond the confines of the press over the camming finger 92, permitting the tray to drop by gravity, emptying the finished product into any desired receptacle.

A short time after this dumping operation, the mold 30 has again reached its position at the end of its travel outward of the press and into register with the bottom of the hopper 62, to once again trip the arm 76 for a refilling operation and the starting of another cycle such as just described, the racks 44 being returned to their starting position by operation of the piston 48 prior to the closing of the press.

The tray 90 is left in its dropped position until it is raised by the return movement of mold 30 and frame 84 when it is cammed back into receiving position by sliding over cam finger 92.

It will readily be seen that from the description of the foregoing operation, I have produced a fully automatic and continuously operating molding machine which, after starting, only requires that the hopper be kept replenished with pellets for molding. Under the old method, it required the full attention of an attendant to operate one machine, and a complete cycle of operation was considerably longer than that required in my present machine wherein one attendant can operate several machines at one and the same time.

A most important point of novelty in my invention lies in the ability to release the molding pressure simultaneously from all faces of the molded product, a feature impossible under the manually operated molds, and the obtainment thereby of a perfected product due to the prevention of trapped air in the molds acting to distort the molded article.

While I have herein shown and described one form of my invention, I desire it to be understood that I in no way wish to be limited to the details of such disclosure, as the same may be modified or changed to suit particular needs or purposes in its further practical application without departing from the spirit of the invention within the scope of the appended claims.

The term "interlocking engagement" employed in the appended claims is to be interpreted broadly to apply where the article is held against rotation with respect to one mold part either by reason of the shape of the article, as by ribs 116, or by reason of the friction or adhesion between the article and the mold part.

What I claim is:

1. In a method of molding hollow articles with screw-thread portions by means of relatively movable mold parts, one of said mold parts having rotatable screw-thread molding means, and the other of said mold parts having moldable material receiving means, the steps of: relatively moving the mold parts into mutual engagement, thus bringing the screw-thread molding means and material receiving means together for pressing the material therebetween to form the article; simultaneously rotating the screw-thread molding means for partially unscrewing the formed article therefrom, and relatively moving the mold parts out of mutual engagement for partially freeing the formed article from the material receiving means thus simultaneously breaking the adherence of said screw-thread molding means and material receiving means to the pressed material of the formed article; continuing the relative movement of the mold parts to completely free the formed article from the material receiving means; relatively moving the mold parts out of alignment for supplying a charge of material to the material receiving means; and, during this latter movement, completing the unscrewing of the article from the screw-thread forming means.

2. In a method of molding hollow articles with screw-threaded internal portions and irregular external portions by means of a rotatable male mold part having a screw-thread molding surface and a retractable female mold part having an irregular molding surface, the steps of: relatively moving the mold parts into mutual engagement for pressing the material therebetween to form the article; simultaneously rotating the male mold part for partially unscrewing the formed article therefrom, and retracting the female mold part for partially freeing the formed article therefrom, thus simultaneously breaking the adherence of said male mold part to the pressed material constituting the screw-threaded face of the formed article and the adherence of the female mold part to the pressed material constituting the irregular face of the formed article; continuing the retraction of the female mold part to completely free the formed article therefrom; relatively moving the mold parts out of alignment for supplying a charge of material to the female mold part; and, during this latter movement, completing the unscrewing of the article from the male mold part.

3. In a machine for molding hollow articles with screw-threaded portions: relatively movable mold parts, one of said mold parts having rotatable screw-thread molding means and the other of said mold parts having moldable material receiving means; means for relatively moving the mold parts into mutual engagement, thus bringing the screw-threaded molding means and material receiving means together for pressing the material therebetween to form the article; means for simultaneously rotating the screw-thread molding means for partially unscrewing the formed article therefrom and relatively moving the mold parts out of mutual engagement for freeing the formed article from the material holding means, thus simultaneously breaking the adherence of said screw-thread molding means and material receiving means to the pressed material of the formed article; means operable for relatively moving the mold parts out of alignment to supply a charge of material to the material receiving means; and means operated through the latter movement of the mold parts for completely unscrewing the article from the screw-thread forming means.

4. In a machine for molding hollow articles with screw-threaded internal portions and irregular external portions: a rotatable male mold part having a screw-thread molding surface; a retractable female mold part having an irregular molding surface; means for relatively moving the mold parts into mutual engagement for pressing the material therebetween to form the article; means operable for simultaneously rotating the male mold part to partially unscrew the formed article therefrom and retracting the female mold part to partially free the formed article therefrom thus simultaneously breaking the adherence of said male mold part to the pressed material constituting the screw-threaded face of the formed article, and the adherence of the female mold part to the pressed material constituting the irregular face of the formed article; means for relatively moving the mold parts out of alignment to supply a charge of material to the female mold part; and means operated through the latter movement of the mold parts for completely unscrewing the article from the male mold part.

5. In a machine for molding screw-threaded articles: a pair of cooperating separable mold parts mounted for relative movement into and out of mutual engagement to form the article, one mold part having thread molding means adapted, upon separation of the mold parts, to retain the article molded thereby, the other mold part having means adapted to receive a charge of material to be molded; said mold parts being also mounted for relative displacement, when separated, transversely of the direction of separating movement for placement out of molding alignment to permit charging of said material receiving means; and means associated with one of said mold parts and operated through the relative transverse displacement thereof for engaging and unscrewing the article from said screw molding means.

6. In a machine for molding screw-threaded articles: a pair of cooperating separable mold plates mounted for relative transverse movement into and out of mutual engagement to form the article, one mold plate having thread molding means adapted, upon separation of the mold plates, to retain the article molded thereby, the other mold plate having means adapted to receive a charge of material to be molded; said mold plates being also mounted for relative longitudinal displacement, when separated, for placement out of longitudinal alignment to charge said material receiving means; and contact elements associated with one of said mold plates and operated through the relative longitudinal displacement thereof for engaging and unscrewing the article from said screw molding means.

7. In a machine for molding screw-threaded articles: a pair of cooperating separable mold plates mounted for relative transverse movement into and out of mutual engagement, one mold plate having thread molding means adapted, upon separation of the mold plates, to retain the article molded thereby, the other mold plate having means adapted to receive a charge of material to be molded and being displaceable longitudinally of the first mentioned mold plate for placement out of longitudinal alignment therewith to receive a charge of material; and means mounted for movement with the second mentioned mold plate and disposed to engage the molded article retained by the thread molding means of the first mentioned mold plate for unscrewing said article from said thread molding means during the longitudinal displacement of said second mentioned mold plate to receive a charge of material.

8. In a machine for molding screw-threaded articles: a pair of cooperating separable mold plates mounted for relative transverse movement into and out of mutual engagement, one mold plate having thread molding means adapted, upon separation of the mold plates, to retain the article molded thereby, the other mold plate having means adapted to receive a charge of material to be molded and being displaceable longitudinally of the first mentioned mold plate for placement out of longitudinal alignment therewith to receive a charge of material; means carried by the second mentioned mold plate for movement therewith and disposed to engage the molded article retained by the thread molding means of the first mentioned mold plate for unscrewing said article from said thread molding means during the longitudinal displacement of said second mentioned mold plate to receive a charge of material; and means mounted to follow the longitudinal displacement of said second mentioned mold plate and arranged in relation to said article unscrewing means for receiving the article unscrewed thereby.

9. In a machine for molding screw-threaded articles: a pair of cooperating separable mold plates mounted for relative transverse movement into and out of mutual engagement, one mold plate having thread molding means adapted, upon separation of the mold plates, to retain the article molded thereby, the other mold plate having means adapted to receive a charge of material to be molded and being displaceable longitudinally of the first mentioned mold plate for placement out of longitudinal alignment therewith to receive a charge of material; means carried by the second mentioned mold plate for movement therewith and disposed to engage the molded article retained by the thread molding means of the first mentioned mold plate for unscrewing said article from said thread molding means during the longitudinal displacement of said second mentioned mold plate to receive a charge of material; means mounted to follow the longitudinal displacement of said second mentioned mold plate and arranged in relation to said article unscrewing means for receiving the article unscrewed thereby; and means actuated by the second mentioned mold plate during its displacement out of longitudinal alignment with the first mentioned mold plate for charging the material receiving means of said second mentioned mold plate.

10. A machine for molding screw-threaded articles comprising: a stationary mold plate having thread molding means adapted to retain a molded screw-threaded article; a movable mold plate having means adapted to receive a charge of material to be molded into said article; means connected to the movable mold plate and being operable to reciprocate the same longitudinally of the stationary mold plate for displacing said movable mold plate in and out of longitudinal alignment with said stationary mold plate; means connected to the movable mold plate and operable to reciprocate the same transversely of the stationary mold plate when in longitudinal alignment therewith for bringing the material receiving means of said movable mold plate into and out of engagement with the thread molding means of said stationary mold plate; and means carried by the movable mold plate for movement therewith and disposed to engage the molded article retained by the thread molding means of the stationary mold plate for unscrewing said article from said thread molding means during the displacement of the movable mold plate out of longitudinal alignment with the stationary mold plate.

11. A machine for molding screw-threaded articles comprising: a stationary mold plate having thread molding means adapted to retain a molded screw-threaded article; a movable mold plate having means adapted to receive a charge of material to be molded into said article; means connected to the movable mold plate and being operable to reciprocate the same longitudinally of the stationary mold plate for displacing said movable mold plate in and out of longitudinal alignment with said stationary mold plate; means connected to the movable mold plate and operable to reciprocate the same transversely of the stationary mold plate when in longitudinal alignment therewith for bringing the material receiving means of said movable mold plate into and out of engagement with the thread molding means of said stationary mold plate; means actuated by the movable mold plate during its displacement out of longitudinal alignment with the stationary mold plate for charging the material receiving means of said movable mold plate; and means carried by the movable mold plate for movement therewith and disposed to engage the molded article retained by the thread molding means of the stationary mold plate for unscrewing said article from said thread molding means during the displacement of the movable mold plate out of longitudinal alignment with the stationary mold plate.

12. A machine for molding screw-threaded articles comprising: a stationary mold plate having thread molding means adapted to retain a molded screw-threaded article; a movable mold plate having means adapted to receive a charge of material to be molded into said article; means connected to the movable mold plate and being operable to reciprocate the same longitudinally of the stationary mold plate for displacing said movable mold plate in and out of longitudinal alignment with said stationary mold plate; means connected to the movable mold plate and operable to reciprocate the same transversely of the stationary mold plate when in longitudinal alignment therewith for bringing the material receiving means of said movable mold plate into and out of engagement with the thread molding means of said stationary mold plate; means carried by the movable mold plate for movement therewith and disposed to engage the molded article retained by the thread molding means of the stationary mold plate for unscrewing said article from said thread molding means during the displacement of the movable mold plate out of longitudinal alignment with the stationary mold plate; and means mounted to follow the movement of the movable mold plate and arranged in relation to said article unscrewing means for receiving the article unscrewed thereby.

13. A machine for molding screw-threaded articles comprising: an upper stationary mold plate; a lower movable mold plate; paralleling rows of screw-thread molding dies rotatably mounted in the upper stationary mold plate transversely thereof to depend therefrom; a pinion rigid with each screw-thread molding die; interconnected slidable racks, one for each row of screw-thread molding dies, and engaging the pinions thereof to rotate the same; a mechanism connected to said interconnected slidable racks and operable to slide the latter; rows of moldable material receiving dies fixedly mounted in the lower movable mold plate and adapted to cooperate with said screw-thread molding dies in the upper stationary mold plate for the formation of the articles; a mechanism connected to the lower movable mold plate and operable to reciprocate the same horizontally for displacing said movable mold plate from and to longitudinal alignment with said stationary mold plate for bringing the moldable material receiving dies in position to receive a charge of such material, and then bringing the charged dies in position for their cooperation with the screw-thread molding dies; means for charging the material receiving dies of the movable mold plate and actuated by the latter during its horizontal displacement out of longitudinal alignment with the stationary mold plate; a mechanism connected to the lower movable mold plate and operable to reciprocate the same vertically when in longitudinal alignment with the upper stationary mold plate for bringing the material receiving dies of said movable mold plate into and out of engagement with the screw-thread molding dies of said stationary mold plate; contact fingers, one for each row of screw-thread molding dies, each finger carried by the lower movable mold plate for movement therewith and disposed to engage the molded articles retained by the screw-thread molding dies of the associated row when the material receiving dies of the movable mold plate are brought out of engagement with said screw-thread molding dies for unscrewing said articles from the latter during the displacement of the movable mold plate out of longitudinal alignment with the stationary mold plate; control means for said mechanisms and functioning to operate in unison the mechanism for sliding the racks and the mechanism for vertically moving the lower mold plate and to operate the mechanism for horizontally moving the lower mold plate in timed relation to the vertical movement thereof; a tray mounted to follow the movement of the movable mold plate and positioned in relation to said article unscrewing fingers for receiving the articles unscrewed thereby; means arranged to cause said tray to tilt for dumping the articles received therein during the horizontal movement of the movable mold plate out of longitudinal engagement with the stationary mold plate and to cause said tray to return to its article receiving position during the horizontal movement of the movable mold plate into longitudinal alignment with the stationary mold plate.

14. In a machine for molding articles from plastic material, the combination of two separable mold parts, one of said parts having a threaded portion for forming screw threads on the molded article and the other mold part having a molding portion providing an interlocking engagement with the molded article to prevent rotation of the molded article with respect thereto but permitting stripping of the molded article therefrom, means for mounting one of said mold parts for rotation about the axis of said threaded portion, means for separating said mold parts, means operated in timed relation with said separating means for rotating said rotatable mold part during separation of the mold parts partially to unscrew the molded article from said threaded part prior to removal of the article from engagement with said interlocking mold part, and means operable in timed relation with said separating means for engaging and rotating said article after separation from said interlocking mold part to finish unscrewing the article from said threaded mold part.

15. In a machine for molding screw threaded articles, the combination of a pair of separable mold parts mounted for relative movement into and out of engagement to form the article, one of said parts having thread molding means adapted, upon separation of said mold parts, to retain the molded article thereon, a movable frame mounted for movement transversely of said thread molding part, and a wiper bar carried by said frame and being positioned on said frame to frictionally engage the molded article and unscrew the same from said thread molding means by movement of said frame.

16. A combination according to claim 15 and including a tray carried by said movable frame and positioned below said wiper bar for receiving the molded article unscrewed by said bar.

17. A combination according to claim 15 and including a tray carried by said movable frame and positioned below said wiper bar to receive unscrewed molded articles, and means rendered effective by the movement of said frame to a position where said tray is withdrawn from below said thread molding part for tilting said tray and discharging molded articles therefrom.

18. In a machine for molding screw threaded articles, in combination, a pair of separable mold parts mounted for relative movement into and out of engagement to form the article, one of said parts having thread molding means adapted, upon separation of the mold parts, to retain the molded article thereon, the other mold part having means adapted to receive a charge of material to be molded, means for supplying a charge of molding material including a movable frame mounted for movement transversely of said thread molding part, and a friction element carried by said frame and being arranged to engage said molded article and unscrew the same from said screw molding means by movement of said frame.

19. In a machine for molding screw threaded articles, the combination of a mold part having thread molding means on which a molded article is retained after being formed thereon, said molded article having a circular outer periphery concentric with said thread molding means, a wiper bar mounted adjacent said mold part with the wiping face thereof positioned in a plane tangent to the periphery of said molded article, and means for causing relative movement between said mold part and said wiper bar in a direction parallel with the axis of said bar to engage said article by said bar and unscrew the article from said mold part by said relative movement.

20. Molding apparatus comprising a press having opposed plates, one of which is movable toward and away from the other, said plates having a multiple of complementary mold elements thereon, the elements of one of said plates being adapted to have a screw-threaded engagement with the molded articles, means for moving one of said plates in a horizontal plane from its normal position in said press to a position outside of said press, and means rendered operative by the horizontal movement of said movable plate in moving from its normal position to a position outside of said press for unscrewing molded articles from said screw threaded elements.

21. Molding apparatus according to claim 20 and including means controlled by the horizontal movement of said horizontally movable plate for supplying charges of molding material to the molding elements carried by one of said plates.

22. Molding apparatus according to claim 20 wherein said opposed plates are positioned one above the other and the upper plate carries screw threaded mold elements which retain the molded articles thereon after each molding operation, and including a tray mounted for movement with said horizontally movable plate and being positioned to receive said molded articles as they are unscrewed from said screw threaded eelments, and means for tilting said tray and discharging molded articles therefrom at a position outside of said press.

23. Molding apparatus comprising a press having upper and lower plates carrying multiple pairs of complementary mold elements thereon, one of said plates being movable towards and away from the other to mold articles between said elements, the elements of the upper plate being adapted to retain the molded articles thereon, and the elements of the lower plate being adapted to receive charges of molding material, means for supplying charges of molding material to the lower mold elements including a movable frame mounted for movement transversely of said press, means carried by said frame for freeing said molded articles from said upper mold elements, and a tray carried by said movable frame and positioned below said article freeing means for receiving the molded articles.

24. Molding apparatus according to claim 23 and including means rendered effective by the movement of said frame to a position where said tray is located outside of said press for tilting said tray and discharging the molded articles therefrom.

25. In combination with a molding press having upper and lower press members, one of which is movable toward and away from the other, a mold plate on the upper press member having a plurality of mold elements thereon which have a threaded engagement with the articles formed in the press, a lower mold plate on the lower press member having a plurality of mold elements therein which are complementary to the mold elements on the upper plate, means on the lower press member providing a trackway which extends to one side of the press, a carriage movable along the trackway from a position at one side of the press to a position over the lower press member, stripper means on the carriage for engaging articles on the mold elements of the upper mold member when the carriage is moved from a position at one side of the press to a position between the press members and unscrewing them, a hinged plate on the carriage for conveying the articles which are so removed by the stripper, there being means for supporting the hinged plate against downward movement when the carriage is between the press members, the hinged plate being free to swing downwardly to a limited extent when the carriage is in position at one side of the press.

26. Apparatus of the class described for use with a molding press having opposed upper and lower press members with relatively movable mold elements thereon and in which the molded articles have a screw threaded engagement with the mold elements of the upper press member comprising a trackway secured to the press, a carriage movable along the trackway from a position at one side of the press to a position between the press members, stripping means on the carriage for unscrewing the molded articles when the carriage is entered between the press members, a receiver on the carriage pivotally supported to swing downwardly from a cap-receiving position to a cap-discharging position and biased to swing downwardly, and means along a part only of the trackway for raising and supporting said receiver when the carriage is moving between the press members, the receiver being free of said means whereby it may tilt downwardly when it is in a position at one side of the press.

27. Molding apparatus comprising a press having upper and lower plates carrying muiiple pairs of complementary mold elements thereon, one of said plates being movable towards and away from the other to mold articles between said elements, the elements of the upper plate being adapted to retain the molded articles thereon, a movable frame mounted for movement transversely of said press, means carried by said frame for freeing said molded articles from said upper mold elements, a tray carried by said movable frame and positioned below said article freeing means for receiving the molded articles, and means rendered effective by the movement of said frame to a position where said tray is located outside of said press for tilting said tray and discharging the molded articles therefrom.

CARL S. PFEILSTICKER.